J. WHITAKER.
PROCESS OF HARDENING THE CUTTING PORTIONS OF CUTTING TOOLS.
APPLICATION FILED AUG. 23, 1910. RENEWED MAY 15, 1914.
1,130,650. Patented Mar. 2, 1915.
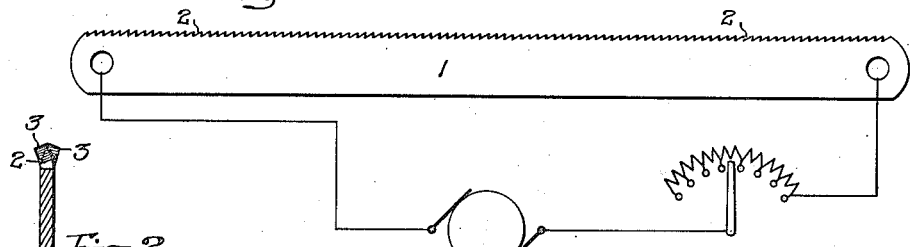
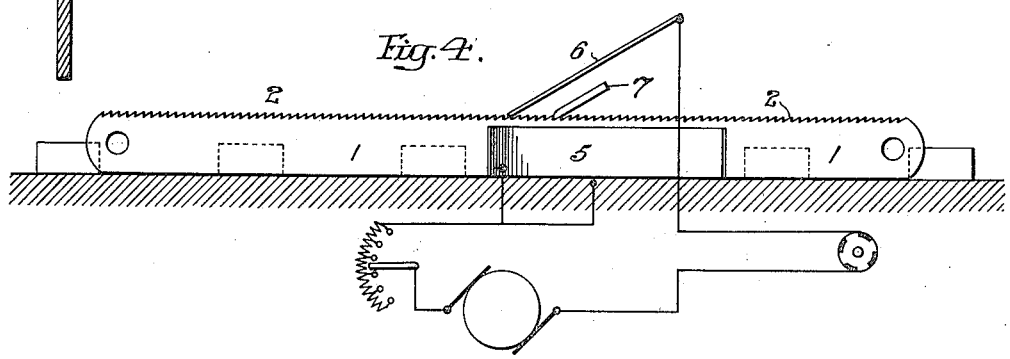
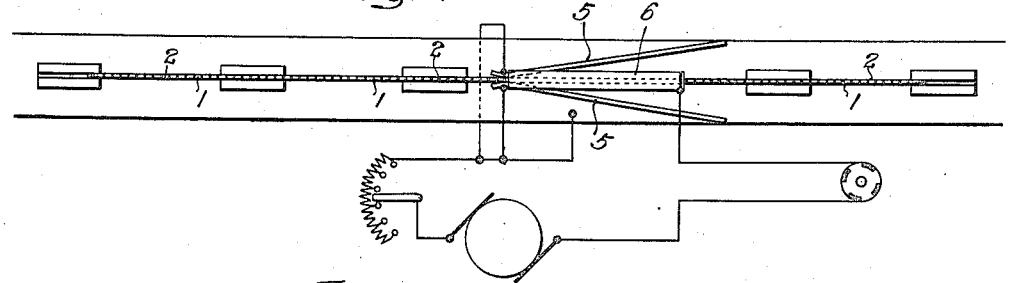
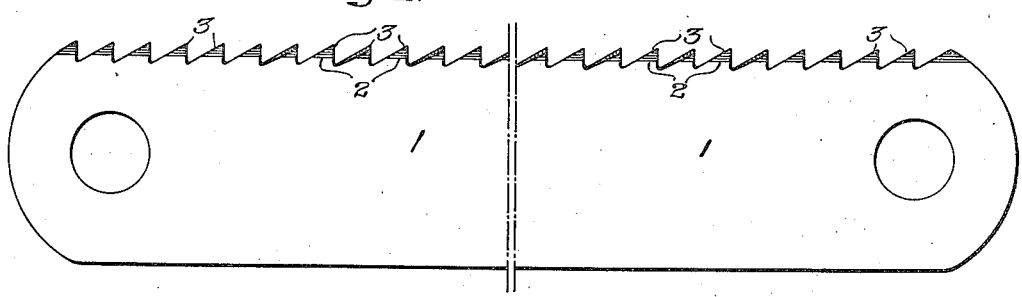
Witnesses:
William H. Rivoir.
Wills A. Burrowes.
Inventor
John Whitaker
by his Attorneys
Howson & Howson

UNITED STATES PATENT OFFICE.

JOHN WHITAKER, OF NORTH WALES, PENNSYLVANIA.

PROCESS OF HARDENING THE CUTTING PORTIONS OF CUTTING-TOOLS.

1,130,650.  Specification of Letters Patent.  Patented Mar. 2, 1915.

Application filed August 23, 1910, Serial No. 578,564. Renewed May 15, 1914. Serial No. 838,896.

*To all whom it may concern:*

Be it known that I, JOHN WHITAKER, a citizen of the United States, residing in North Wales, Montgomery county, Pennsylvania, have invented certain Improvements in the Process of Hardening the Cutting Portions of Cutting-Tools, of which the following is a specification.

My invention relates to the manufacture of hack saw blades, and the object of my invention is to produce a hack saw blade having a maximum degree of flexibility coupled with extremely hard teeth forming a cutting edge.

A further part of my invention is the method or process of hardening the teeth of the saw.

My invention is more or less diagrammatically set forth in the accompanying drawings, in which:

Figure 1, is a side elevation of a hack saw blade; Fig. 2, is a cross sectional view of the same; Fig. 3, is a view illustrating one step in the preparation of the blades; Fig. 4, is a side elevation of means employed for the purpose of hardening the teeth, and Fig. 5, is a plan view of the same.

As is well known, hack saw blades are subject to very rough usage and breakage of the same is very frequent. Attempts have been made to overcome the many objections possessed by them, but without valuable result. The use of a soft back with a hard edge has not been successful nor has the use of a softer blade portion between the cutting edge and the back edge, both of which are of a hard temper, proven satisfactory. The saw of my invention, on the contrary, possesses flexibility with extremely hard teeth, and may spring or bend without breaking, returning to its normal plane when the forces tending to bend it are released.

In Figs. 1 and 2 of the drawings, 1 represents the blade of a hack saw and 2 the teeth of the same. In treating the saw, only the points of the teeth, indicated at 3, are given the final hardness desirable for proper cutting purposes; the rest of the saw blade to the back of the same being spring tempered so as to be flexible. In such condition it will yield before breaking and will return to its normal plane after bending.

In preparing my improved hack saw blade I may take any ordinary commercial blade on the market, preferably one, however, having a large degree of hardness, made of high carbon steel, for instance, but relatively brittle, possessing but little flexibility and tempered with a view to securing as hard cutting teeth as possible, without reference to the question of flexibility, or I may prepare a blade in any usual or well known manner and harden and temper it by any suitable and efficient process or method. In either instance I draw the temper of such blade to an extent sufficient to render it spring-like, by any suitable heating means, and for this purpose I may connect the terminals of a suitable source of electricity with the ends of the saw and pass current through the blade for a length of time sufficient for the desired purpose; Fig. 3, illustrating diagrammatically this operation. It will be understood, of course, that any well-known means of drawing the temper may be employed in lieu of the electrical means noted above. The saw is then ready to receive the treatment necessary to harden the teeth of the same. For this purpose I may mount the saw in a suitable position, preferably with the teeth uppermost and the blade vertically disposed, in the manner, for instance, as shown in Fig. 4, and connect such blade with one terminal of a source of electricity, and such connections may be in the form of wipe contacts 5 lying in position for engagement with the blade as the latter is moved. Attached to the other terminal of the source of electricity is an electrode or heating element 6 of suitable material suitably supported and designed for contact with each tooth whereby the same or any desired part thereof may be heated in the manner desired, separately and successively, or in some instances a plurality of teeth may be engaged and simultaneously heated; the current being so regulated and the period of contact so proportioned that each tooth will be heated to a certain degree, affecting in greater or less degree, as may be desired, only that portion of such tooth above the root of the same. The heating is momentary; the blade providing means for quickly dissipating the heat in addition to the air surrounding the tooth, which is of a relatively small cross section. The result is the hardening of the teeth instead of softening as might otherwise be if the heating were carried to a greater extent or if the mass of metal heated was sufficiently large to prevent the heat being dissipated quickly enough to harden the steel. The electrode designed to contact with these teeth is so connected with a source of electricity that a current is made and broken between its engagement with the successive teeth, in order to avoid danger of arcing, which would destroy the points of the saw, and during the time the current is broken, the saw is fed by suitable means designed to engage the teeth and feed the same to the extent of a tooth at a time.

Any suitable means may be employed to feed the saw, and in the drawings I have indicated a pawl 7 which may be actuated in synchronism with the heating element. If desired, the saw may be maintained stationary and the electrode or heating element moved. I may also dispose the electrode or heating element for engagement with the teeth directly adjacent the electrodes in contact with the surface of the blade, in order that as the circuit is made with the blade the current may be dissipated readily as well as the heat generated.

While I have described the use of electricity as the means of heating each tooth to effect the hardening of the same, it will be understood that such result may be produced with some local treating or heat producing agency, other than electricity. The important points of the process are, the hardening of the blade throughout—then drawing to the desired spring temper—then rehardening the point of the teeth, or as much of the tooth as may be desired. The result attained by my process is a saw having a spring tempered blade, teeth with extremely hard cutting points with a body of tough material between such points and the blade; such body preventing the teeth breaking away the spring tempered blade. By preference, the hardening of the teeth is at the points of the same as indicated by the shading in the drawings, but it will be understood that the extent or limits of this hardening may vary within the scope of my invention. For instance, it may be desirable for some purposes to harden only the extreme points of the teeth, while in other instances it may be desirable to harden the teeth almost to the roots of the same. In all instances, however, the hardening of the teeth will not affect the temper and flexibility of the rest of the blade which will possess the desired spring temper and necessary hardness compatible therewith, nor the tough portion of the saw connecting the teeth and blade.

After the teeth are rehardened, the temper may be drawn in them to whatever degree of hardness is best suited for the purpose to which they are to be put. This may be done by any of the usual methods such as immersing in sand or oil or other substance heated to the proper temperature.

While I have described my invention with reference to hack saw blades it will be understood that it is not limited thereto and that the same method of treatment to produce the desired result may be applied to band saws, band knives, and to other forms of cutting instruments such as small metal cutting circular saws or thin milling tools, wherein the property of having a spring tempered flexible blade with an extremely hard cutting edge that will resist wear is desired.

I claim:

1. The process of treating cutting tools which consists in tempering the body or blade of the same to the point of spring flexibility, and then hardening the edge of such spring tempered body by separate momentary applications to isolated portions thereof of a high degree of heat.

2. The process of treating cutting tools which consists in tempering the body or blade of the same to the point of spring flexibility and then hardening the edge of such spring tempered body by separate momentary applications to isolated portions thereof of a current of electricity to heat the same to a high degree.

3. The process of preparing hack saw blades which consists in tempering the blade to the degree of spring flexibility, and then hardening the toothed portion of such blade by separate and momentary applications of a high degree of heat to the points of said teeth.

4. The process of preparing hack saw blades which consists in tempering the blade to the degree of spring flexibility, and then hardening the teeth by momentary applications of a high degree of heat to each of said teeth separately and independently.

5. The process of treating hack saw blades which consists in tempering the body of the blade to the flexibility of spring metal and then subjecting the points of the teeth to a high degree of heat, such heating being momentary and applied separately to each point, and the engagement of the teeth by the heating agent being alternated by movements of the heating agent or saw with respect to the other.

6. The process of treating hack saw blades which consists in first tempering the body of the blade to the flexibility of spring metal and then subjecting the points of the teeth to the application of a current of electricity, such heating being momentary and of great intensity, and applied separately to each point, and the engagement of the tooth by the current carrying agent being alternated by the breaking of said current.

7. The process of treating cutting tools which consists in tempering the body or blade of the same to the point of spring flexibility, and then hardening the edge of such body or blade by momentary applications to isolated portions thereof of a high degree of heat.

8. The process of treating cutting tools which consists in tempering the body or blade of the same to the point of spring flexibility, and then hardening the edge of such body or blade by momentary applications to isolated portions thereof of a current of electricity to heat the same to a high degree.

In testimony whereof, I have signed my name to this specification, in the presence of two subscribing witnesses.

JOHN WHITAKER.

Witnesses:
MURRAY C. BOYER,
WM. BROWN, Jr.